(12) United States Patent
Aderhold (10) Patent No.: US 12,379,253 B2
(45) Date of Patent: Aug. 5, 2025

(54) EMISSIVITY INDEPENDENCE TUNING

(71) Applicant: Applied Materials, Inc., Santa Clara, CA (US)

(72) Inventor: Wolfgang Aderhold, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 680 days.

(21) Appl. No.: 17/832,296

(22) Filed: Jun. 3, 2022

(65) Prior Publication Data

US 2023/0392987 A1 Dec. 7, 2023

(51) Int. Cl.
*G01J 5/00* (2022.01)
*G01J 5/80* (2022.01)

(52) U.S. Cl.
CPC ............... *G01J 5/0003* (2013.01); *G01J 5/80* (2022.01); *G01J 2005/0074* (2013.01)

(58) Field of Classification Search
CPC . G01J 5/0003; G01J 5/80; G01J 5/004; G01B 21/085
See application file for complete search history.

(56) References Cited

U.S. PATENT DOCUMENTS

| | | |
|---|---|---|
| 2003/0236642 A1 | 12/2003 | Timans |
| 2006/0228818 A1 | 10/2006 | Chacin et al. |
| 2019/0066986 A1 | 2/2019 | Iliopoulos |
| 2019/0171181 A1 | 6/2019 | Nurani et al. |
| 2020/0196389 A1 | 6/2020 | Ueno et al. |
| 2022/0082445 A1 | 3/2022 | Cong et al. |
| 2023/0374664 A1* | 11/2023 | Rojek ............... H01L 21/67248 |

FOREIGN PATENT DOCUMENTS

| | | |
|---|---|---|
| CN | 1695228 A | 11/2005 |
| TW | 201809843 A | 3/2018 |

OTHER PUBLICATIONS

International Preliminary Report on Patentability from PCT/US2023/020870, mailed Dec. 12, 2024, 5 pgs.
International Search Report and Written Opinion from PCT/US2023/020870 dated Aug. 23, 2023, 8 pgs.
Official Letter for Taiwan Patent Application No. 112120227 dated Jan. 15, 2025, 5 pages.

* cited by examiner

*Primary Examiner* — David P Porta
*Assistant Examiner* — Casey Bryant
(74) *Attorney, Agent, or Firm* — Schwabe, Williamson & Wyatt, P.C.

(57) ABSTRACT

Embodiments disclosed herein include a method of calibrating a processing tool. In an embodiment, the method comprises providing a first substrate with a first emissivity, a second substrate with a second emissivity, and a third substrate with a third emissivity. In an embodiment, the method may include running a recipe on each of the first substrate, the second substrate, and the third substrate, where the recipe includes a set of calibration attributes. In an embodiment, the method may further comprise measuring a layer thickness on each of the first substrate, the second substrate, and the third substrate. In an embodiment, the method further comprises determining if the layer thicknesses are uniform.

20 Claims, 8 Drawing Sheets

EMISSIVITY INDEPENDENCE TUNING

BACKGROUND

1) Field

Embodiments relate to the field of semiconductor manufacturing and, in particular, processes and apparatuses for implementing emissivity independence tuning for a thermal oxidation process.

2) Description of Related Art

Thermal oxidation processes are typically used in semiconductor process flows. Thermal oxidation may be implemented in a chamber that includes one or more lamps in order to heat a substrate provided in the chamber. There may be one or more lamp zones in order to control the temperature across the surface of the substrate. One or more pyrometers may be used in order to provide feedback to a controller that controls the power of the lamps. The pyrometers may be on the opposite side of the substrate from the lamps or on the same side as the lamps.

The signal from the pyrometers is typically processed before being sent to the controller. For example calibration attributes or a mask may be applied to the signals before being used by the controller. The calibration attributes may include offsets that are used in order to account for different emissivities of the substrate. Ideally, the process is emissivity independent. That is, the control of the lamps does not depend on the emissivity of the substrate.

In order to provide emissivity independence a calibration process is implemented. The calibration process may be implemented after planned maintenance (PM) or hardware changes. The calibration process is typically done by manual intervention and data entry into the tool. This leads to the possibility of errors copying data from computer screen to keyboard and collecting metrology data to input. Accordingly, the existing process is prone to errors and requires skilled persons to implement the process.

SUMMARY

Embodiments disclosed herein include a method of calibrating a processing tool. In an embodiment, the method comprises providing a first substrate with a first emissivity, a second substrate with a second emissivity, and a third substrate with a third emissivity. In an embodiment, the method may include running a recipe on each of the first substrate, the second substrate, and the third substrate, where the recipe includes a set of calibration attributes. In an embodiment, the method may further comprise measuring a layer thickness on each of the first substrate, the second substrate, and the third substrate. In an embodiment, the method further comprises determining if the layer thicknesses are uniform.

Embodiments disclosed herein may also include a processing environment. In an embodiment, the processing environment may include a host computer, and a processing tool communicatively coupled to the host computer. In an embodiment, the host computer interfaces with software stored in a memory of the processing tool, wherein the software comprises a uniformity algorithm for setting offsets between signals measured by a pyrometer that is used by a controller as feedback to control a recipe.

Embodiments disclosed herein may further comprise a method for calibrating a processing tool to be emissivity independent. In an embodiment, the method comprises providing a first substrate with a first emissivity film, a second substrate with a bare silicon surface, and a third substrate with a second emissivity film. In an embodiment, the method further comprises processing the first substrate, the second substrate, and the third substrate in the processing tool with a recipe to form an oxide film on the first substrate, the second substrate, and the third substrate. In an embodiment, the recipe includes calibration attributes to modify signals from a pyrometer that are sent to a controller as feedback information. In an embodiment, the method further comprises measuring the oxide film on each of the first substrate, the second substrate, and the third substrate, and modifying the calibration attributes when the oxide films are non-uniform.

DETAILED DESCRIPTION

Systems described herein include processes and apparatuses for implementing emissivity independence tuning for a thermal process. One example of a thermal process is oxidation. Another example is implant anneal. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

As noted above, thermal oxidation processes need calibration in order to be emissivity independent. Particularly, the pyrometers of the thermal oxidation chamber need to be calibrated in order to provide accurate feedback to the controller of the thermal oxidation chamber. This calibration may include the generation of calibration attributes. The calibration attributes may be offset values that increase or decrease the value of the signal detected by the pyrometers in order to account for emissivity differences between substrates.

Currently, the calibration process is implemented through the use of manual intervention. Manual calibration is prone to errors due to data entry errors, metrology analysis errors, or the like. Accordingly, embodiments disclosed herein include an automated process in order to provide the calibration of the pyrometers. The calibration process may be implemented by a host computer that is communicatively coupled to the thermal oxidation tool. The host computer may provide instructions for selecting substrates to be processed, processing the substrates with a given recipe, and running metrology on the substrates. The tool may include software stored in a memory that is able to find optimized calibration attributes. For example, physics based models and other algorithms may be used in order to find the optimized calibration attributes.

The benefits of an automated process may include the ability to perform the process without a specialist present. Additionally, there are fewer errors with data input. The green-to-green turnaround time may also be improved. Additionally, a record of past tuning for data analysis for tool health can be obtained. Furthermore, better chamber matching within a fleet is possible, as all chambers will follow the same procedure. Substrate waste is also improved.

Figure 1A:
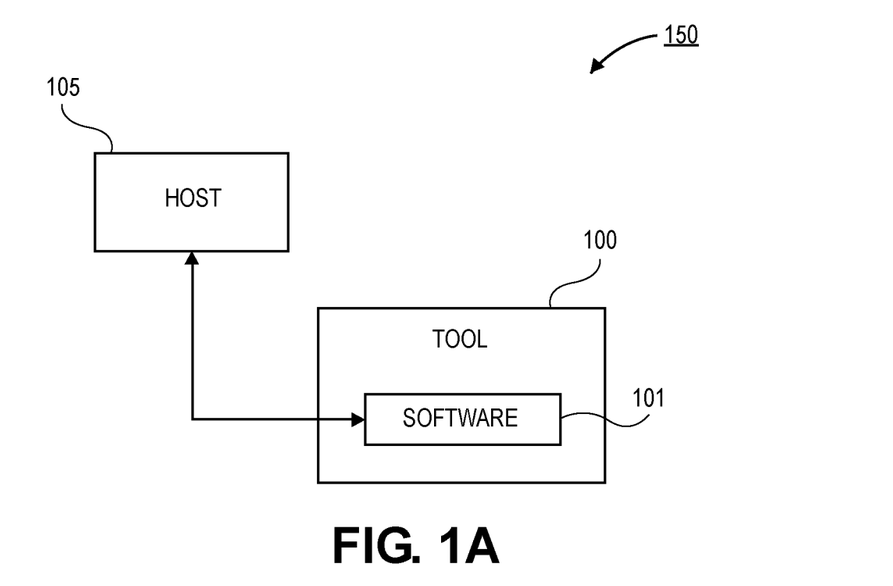
FIG. 1A is a block diagram of a processing environment that includes a host computer and a tool, in accordance with an embodiment.

Referring now to FIG. 1A, a block diagram of a processing environment 150 is shown, in accordance with an embodiment. In an embodiment, the processing environment 150 may include a host computer 105. The host computer 105 may be a fab automation system. For example, the host computer 105 may be communicatively coupled to two or more tools 100 in a fab environment. In the illustrated embodiment, the host computer 105 is shown as being coupled to a single tool 100 for simplicity. In an embodiment, the tool 100 may be any suitable tool for processing substrates in a fab environment. For example, the tool 100 may include a chamber that is used to perform thermal oxidation processes.

The host computer 105 may include instructions stored in a memory in order to execute a chamber calibration process on the tool 100. The chamber calibration process will be described in greater detail below. In an embodiment, the host computer 105 may be communicatively coupled to software 101 stored in a memory on the tool 100. The software 101 may include instructions for operating the tool 100 in accordance with a recipe provided by (or selected by) the host computer 105.

The software 101 may also include an algorithm for determining calibration attributes after processing a set of substrates. The calibration attributes are offsets that are added to signals generated by one or more pyrometers in the tool before the signals are sent to a controller as feedback information in order to control the processing in the tool. The algorithm may be based on physics based models for the thermal heat sources and a replication of the algorithms that convert pyrometer sensor data into temperatures that provide feedback control to the controller.

Figure 1B:
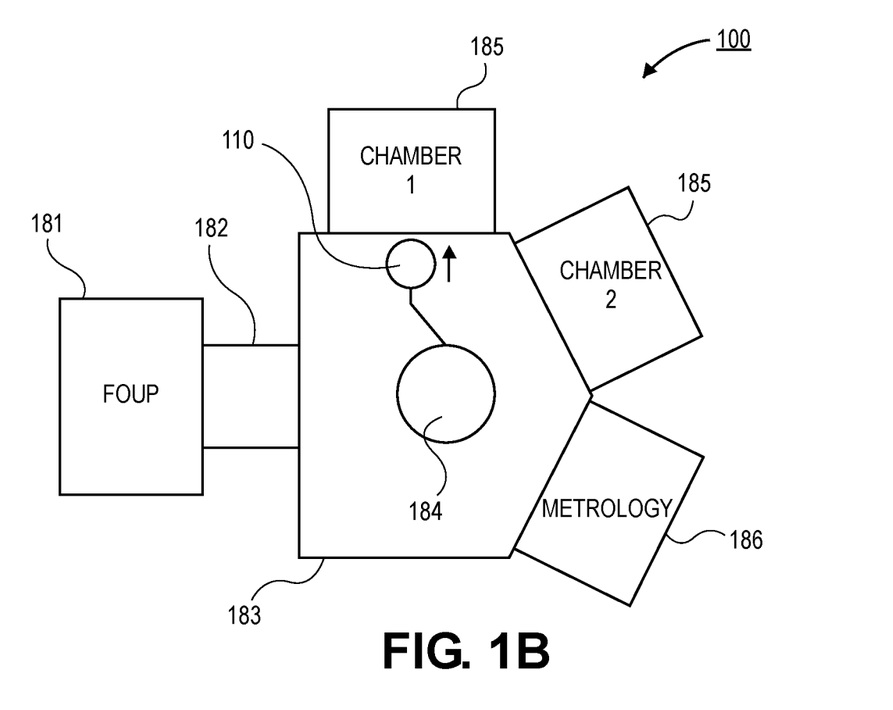
FIG. 1B is a block diagram of a processing tool that includes a FOUP, a central chamber, processing chambers, and a metrology chamber, in accordance with an embodiment.

Referring now to FIG. 1B, a block diagram of the tool 100 is shown, in accordance with an embodiment. In a particular embodiment, the tool 100 may include a central chamber 183. The central chamber 183 may include a robot 184 for handling substrate 110 and moving the substrates 110 throughout the tool 100. In an embodiment, the central chamber 183 may be coupled to a front opening unified pod (FOUP) 181 through a load port 182. The FOUP 181 may contain a plurality of substrates 110 that are to be processed by the tool 100. In an embodiment, the substrates 110 may be any suitable substrate form factor. In a particular embodiment, the substrates 110 are silicon substrates. The diameter of the substrates 110 may be 300 mm, though smaller or larger form factor substrates 110 may be used. Additionally, materials other than silicon may be used as the substrates 110.

In an embodiment, a processing chamber 185 may be coupled to the central chamber 183. The processing chamber 185 may be a thermal oxidation chamber 185 in some embodiments. The details of the thermal oxidation chamber 185 are provided below. In the particular embodiment shown in FIG. 1B, a pair of chambers 185 (e.g., chamber 1 and chamber 2) are coupled to the central chamber 183. Chamber 1 and chamber 2 may both be thermal oxidation chambers. In other embodiments, chamber 1 and chamber 2 may be different types of chambers (e.g., to provide different processing operations).

In an embodiment, the tool 100 may also comprise a metrology chamber 186. The metrology chamber 186 may be used in order to provide thickness measurements of films formed on substrate 110 in the chambers 185. For example, the metrology chamber 186 may include line scan capabilities in order to determine film thicknesses across the surface of the substrate 110. In the illustrated embodiment, the metrology chamber 186 is coupled to the central chamber 183. Though, it is to be appreciated that the metrology chamber 186 may be part of a different tool in some embodiments. In an embodiment, the metrology chamber 186 may also measure the emissivity of the substrate and use the measured emissivity as an input to the emissivity dependent algorithm.

In the illustrated embodiment, the chambers 185 and 186 are coupled together by the central chamber 183. However, it is to be appreciated that the chambers 185 and 186 may be standalone chambers that are not coupled together by a central chamber 183.

Figure 2:
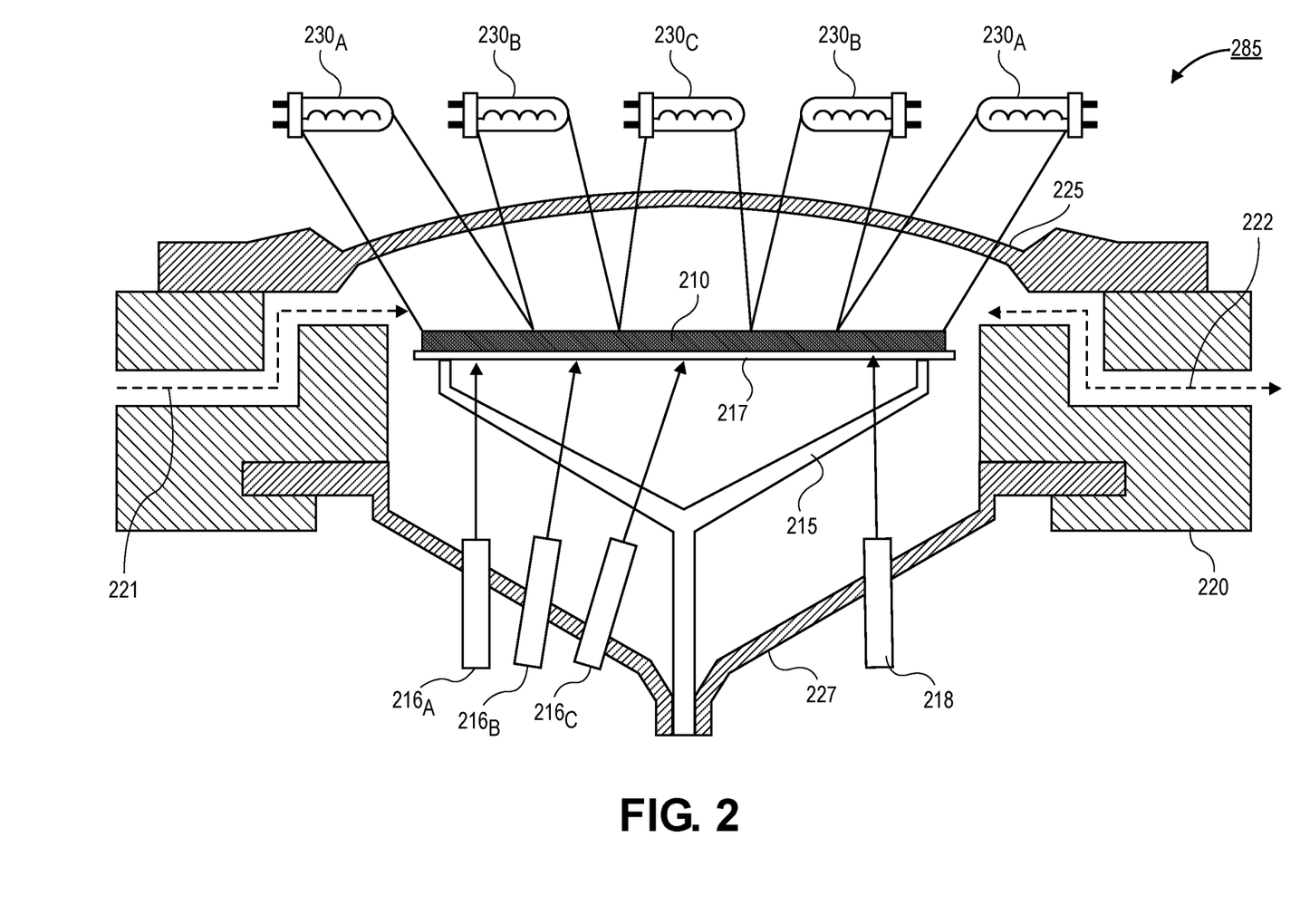
FIG. 2 is a cross-sectional illustration of a semiconductor processing chamber that is used to provide thermal oxidation processes, in accordance with an embodiment.

Referring now to FIG. 2, a cross-sectional illustration of a processing chamber 285 is shown, in accordance with an embodiment. In an embodiment, the chamber 285 may comprise any type of semiconductor manufacturing chamber that may require precise substrate temperature control. In the illustrated embodiment, a chamber 285 without plasma capability is shown. However, it is to be appreciated that the chamber 285 may also comprise the capability to use a plasma in order to implement various processing regimes.

In an embodiment, the chamber 285 may comprise a chamber body 220. The chamber body 220 may include any suitable material, such as stainless steel, or the like. In an embodiment, a coating (not shown) may be provided over an interior surface of the chamber body 220. For example, the coating may be a chamber seasoning or protection layer. In an embodiment, gas 221 may enter the chamber 285 through a first portion of the chamber body 220, and gas 222 may exit the tool through a second portion of the chamber body 220. While the gas 221 and 222 are shown entering and exiting through the chamber body 220, it is to be appreciated that the gas may enter or exit the chamber through any portion of the chamber 285, depending on the type of chamber 285 that is being used.

In an embodiment, a substrate support 215 may be provided in the chamber 285. The substrate support 215 may comprise three pins that touch and support the substrate 210 backside directly or there may be a susceptor 217 that is transparent for pyrometry. The substrate support 215 and the susceptor 217 are configured to hold and/or secure a substrate 210. For example, the substrate 210 may be a semiconductor substrate, such as a silicon wafer. The substrate 210 may have any suitable form factor. For example, a diameter of the substrate 210 may be 300 mm, 450 mm, or any standard wafer form factor. Additionally, other substrates 210 may be used in the chamber 285. For example, glass substrates, ceramic substrates, or the like may also be used in some embodiments. In an embodiment, the substrate support 215 and the susceptor 217 may be configured to rotate. The rotation allows for improved temperature uniformity across the substrate 210.

The susceptor 217 may include any type of chucking architecture in order to secure the substrate 210. In some embodiments, the susceptor 217 may include an electrostatic chucking (ESC) architecture. In such an embodiment, the substrate 210 is secured to the susceptor 217 by an electrostatic force. Other embodiments may include a vacuum chucking architecture for the susceptor 217. In an embodiment, the susceptor 217 and the substrate support 215 may comprise a quartz material or another material that is at least substantially transparent to infrared radiation. As such, a temperature of the backside surface of the substrate 210 can be obtained by pyrometers 216.

In an embodiment, the chamber 285 may include a lid 225. The lid 225 may sometimes be referred to as a chamber dome. While shaped as a dome, it is to be appreciated that lid 225 may have any architecture (e.g., a flat surface or the like). The lid 225 may be formed from a material that is at least substantially transparent to infrared radiation. For example, the lid 225 may comprise quartz or the like.

In an embodiment, the chamber 285 may also include a bottom lid 227. The bottom lid 227 may cover a bottom surface of the chamber 285. The bottom lid 227 may comprise a material that is at least substantially transparent to infrared radiation. As such, pyrometers on the bottom side of the chamber 285 can be used to measure a temperature of a bottom surface of the substrate 210. In an embodiment, the bottom lid 227 may be coupled to the substrate support 215. More particularly, the substrate support 215 may pass through the bottom lid 227. The bottom lid 227 is coupled to the substrate support 215 in a configuration that allows for the substrate support 215 to freely rotate.

In an embodiment, a plurality of lamps 230 may be provided outside the internal volume of the chamber 285. The internal volume of the tool may refer to the volume defined by the lid 225, the chamber body 220, and the bottom lid 227. That is, the lamps 230 are not provided within the internal volume of the chamber 285 where the substrate processing is implemented. In the illustrated embodiment, three sets of lamps $230_A$-$230_C$ are provided over a top surface of the lid 225. Each of the lamps $230_A$-$230_C$ represent different lamp regions. Lamps $230_A$ may be for an outer zone of the substrate 210, lamps $230_B$ may be for a middle zone of the substrate 210, and lamp $230_C$ may be for a central zone of the substrate 210. The lamps $230_A$-$230_C$ may be focused on the different zones by a reflector (not shown) that is provided around the lamps 230. While one or two lamps 230 are shown for each zone, it is to be appreciated that any number of lamps may be used to heat each zone of the substrate 210. In the illustrated embodiment, the lines from the lamps 230 to the substrate 210 illustrate perfect focusing of the infrared light to a particular region of the substrate. However, it is to be appreciated that infrared light from the lamps 230 may overlap each other to some degree. In the illustrated embodiment, three front-side lamp zones are shown. However, it is to be appreciated that more than three lamp zones may be included in other embodiments. For example, the reflector structure may include four or more zones in order to provide even more enhanced control of the temperature across the surface of the substrate 210.

In an embodiment, the plurality of pyrometers $216_A$-$216_C$ may be provided through the bottom lid 227. The pyrometers 216 may be focused onto the backside surface of the substrate 210. In an embodiment, the number of pyrometers 216 may be equal to the number of heating zones on the substrate 210. For example, three heating zones are shown in FIG. 2, and three pyrometers $216_A$-$216_C$ are provided. The pyrometer $216_A$ may measure temperature at an outer region of the substrate 210, the pyrometer $216_B$ may measure temperature at a middle region of the substrate 210, and the pyrometer $216_C$ may measure temperature at a central region of the substrate 210.

In an embodiment, a reflectometer 218 may be situated at the same side as the pyrometers 216. The reflectometer 218 may be used to measure the emissivity of the substrate and provide that information to the algorithm.

Figure 3:
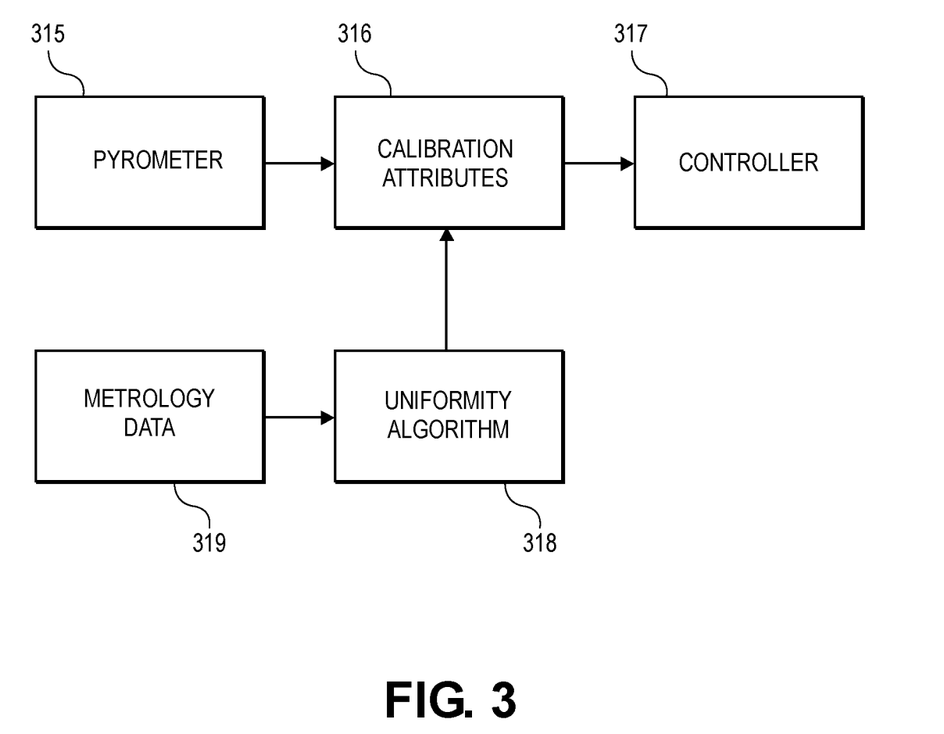
FIG. 3 is a block diagram of an algorithm for updating calibration attributes for pyrometer data, in accordance with an embodiment.

Referring now to FIG. 3, a block diagram of an algorithm for setting calibration attributes is shown, in accordance with an embodiment. In an embodiment, the algorithm may be implemented by software 101 in the tool 100. Generally, the pyrometer 315 generates a signal that is processed by calibration attributes 316 before being passed to the controller 317. The controller 317 may use the signal as a feedback input in order to control the power delivered to the lamps 225 of the chamber 285. In an embodiment, the calibration attributes 316 are offset values that are added to the signal in order to account for various conditions, such as the emissivity of the substrate. That is, different emissivities will result in different readings by the pyrometer 315. As such, the calibration attributes 316 work to nullify the impact of emissivity on the sensor reading in order to provide an emissivity independent feedback signal to the controller 317.

In an embodiment, the calibration attributes 316 may be generated by a uniformity algorithm 318. The uniformity algorithm 318 may be an algorithm that is stored in a memory of the tool 100. Particularly, metrology data 319 is used to inform the uniformity algorithm 318. The metrology data 319 may be generated by a metrology chamber 186 or the like. For example, metrology data (e.g., film thicknesses) from three or more substrates with different emissivities may be used in order to provide data for the uniformity algorithm 318.

In an embodiment, the uniformity algorithm 318 may include a physics based model for the thermal heat sources and a replication of the algorithm that converts the pyrometer sensor data into temperature values for the controller. The physics based model may be a thermal model of the chamber 285. That is, the heat sources, and the different components of the chamber 285 are modeled using physics based equations (e.g., heat transfer equations) in order to provide an accurate thermal model of the chamber 285. The thermal model can then be used in order to calculate the backside temperatures of the substrate at different times during the recipe. The calculated temperatures can then be compared to the pyrometer readings in order to determine an offset that is used for the calibration attributes.

Figure 4:
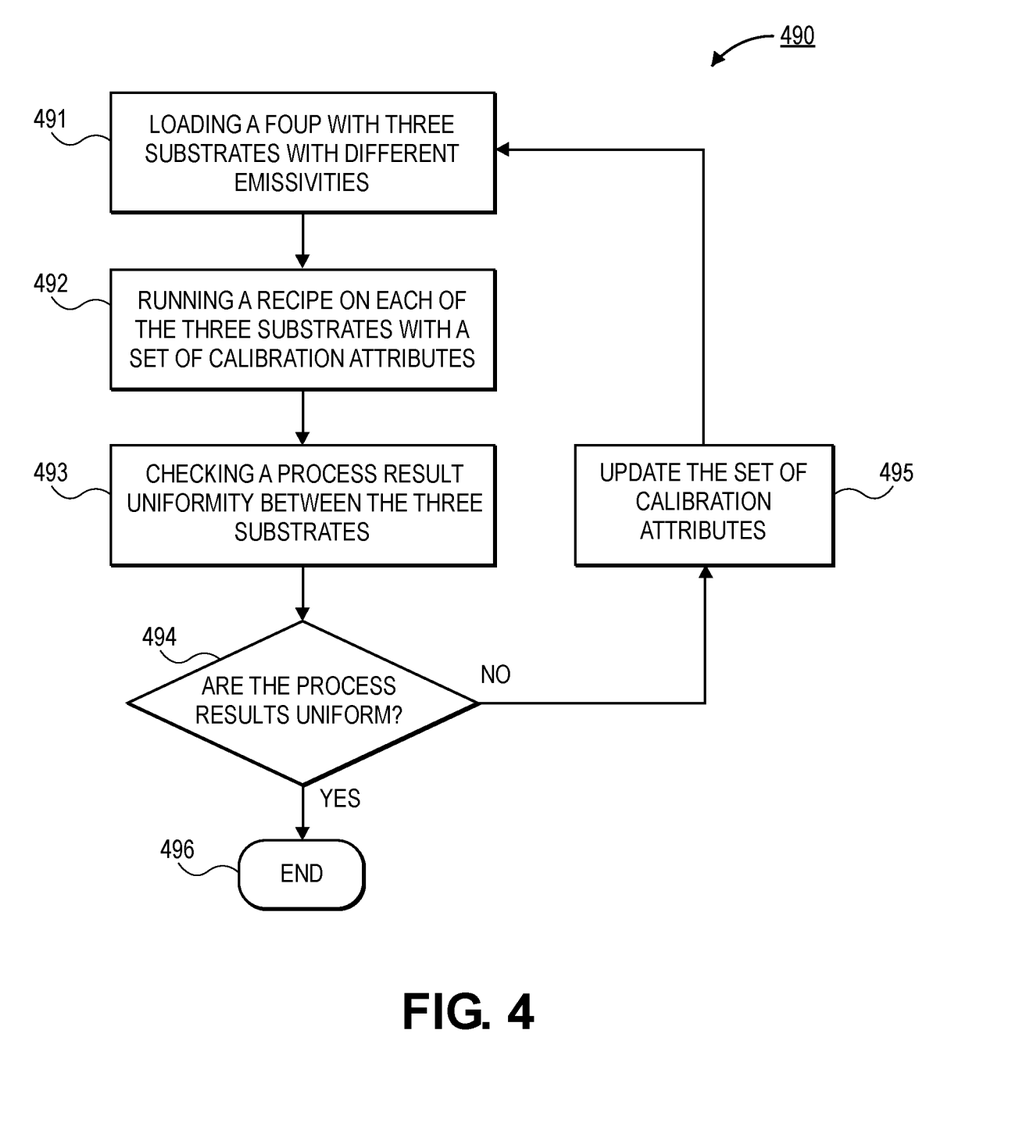
FIG. 4 is a process flow diagram depicting a process for calibrating a processing tool to be emissivity independent, in accordance with an embodiment.

Referring now to FIG. 4, a process flow diagram of a process 490 for calibrating a chamber 285 to be emissivity independent is shown, in accordance with an embodiment. The process 490 may be executed in the processing environment 150 using the host computer 105 and the software 101 of the tool 100. In other embodiments, the entirety of the process 490 may be implemented by the software 101 of the tool 100, or by the host computer 105.

In an embodiment, process 490 may begin with operation 491, which comprises loading a FOUP with three substrates with different emissivities. In an embodiment, more than three substrates may be provided in the FOUP as well. For example, six substrates may be provided in the FOUP, and the six substrates may have three different emissivities (i.e., each emissivity level may be implemented on two substrates). In an embodiment, the substrates may be fabricated in the fab environment. In other embodiments, the substrates may be obtained from an external source of substrates. It is to be appreciated that the substrates may also be recycled or refurbished after the process 490 so that substrate waste is minimized.

Figure 5A:
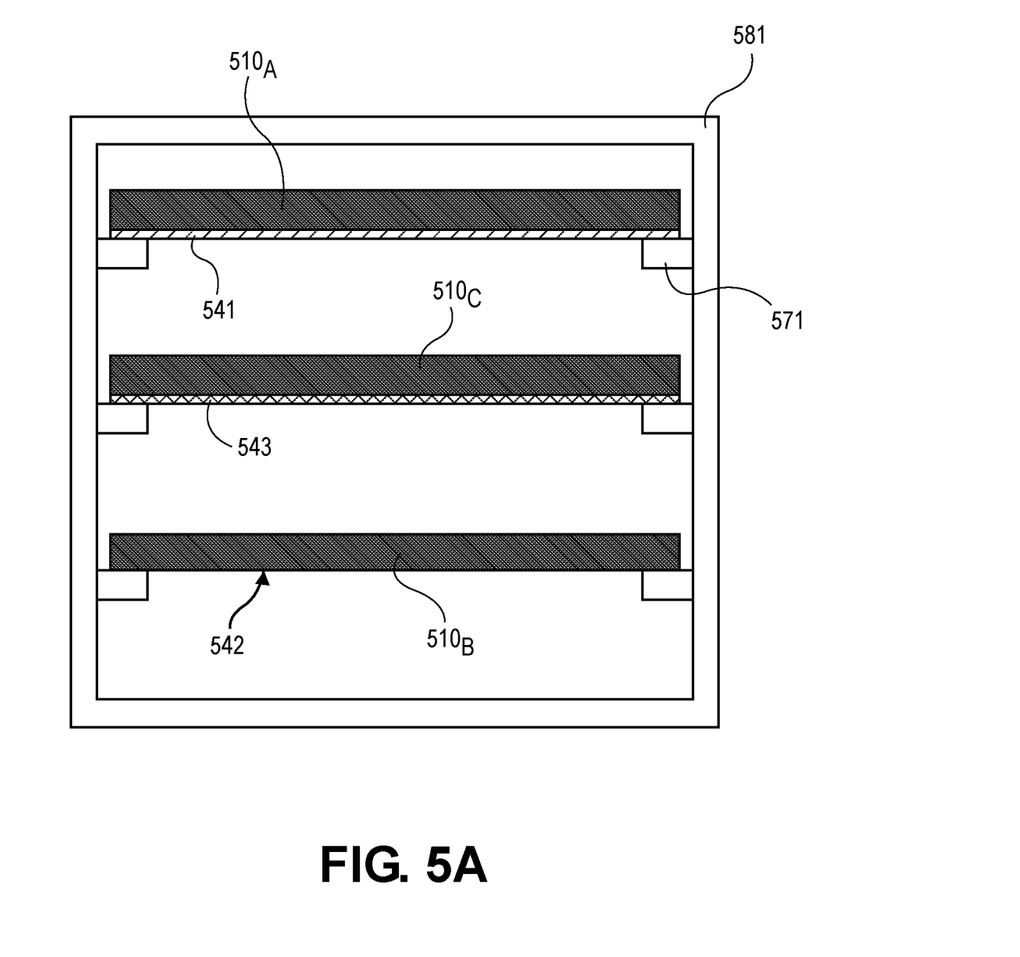
FIG. 5A is a cross-sectional illustration of a front opening unified pod (FOUP) that includes three substrates with different emissivities, in accordance with an embodiment.

An example of such a FOUP 581 is shown in FIG. 5A. As shown, the FOUP 581 may include at least three slots 571 for supporting substrates 510. A first substrate $510_A$ may have a layer 541 with a first emissivity, a second substrate $510_B$ may have a bottom surface 542 that is bare silicon with a second emissivity, and a third substrate $510_C$ may have a layer 543 with a third emissivity. In an embodiment, the first emissivity may be greater than the second emissivity, and the second emissivity may be greater than the third emissivity. In a particular embodiment, the layer 541 may comprise nitrogen (e.g., a nitride film), and the layer 543 may comprise oxygen (e.g., an oxide film). The top surfaces of the substrates $510_A$-$510_C$ may be bare silicon surfaces in some embodiments. While three substrate $510_A$-$510_C$ are shown in FIG. 5A, it is to be appreciated that any number of substrates 510 may be included in the FOUP 581.

Returning back to process 490 in FIG. 4, process 490 may continue with operation 492 which comprises running a recipe on each of the three substrates with a set of calibration attributes. The calibration attributes may be set prior to running the recipes. Previously used calibration attributes (e.g., before a planned maintenance event, or before hardware changes) may be used to run the recipes. The calibration attributes provide an offset for pyrometer data in order to provide more accurate feedback signals to the controller.

Figure 5B:
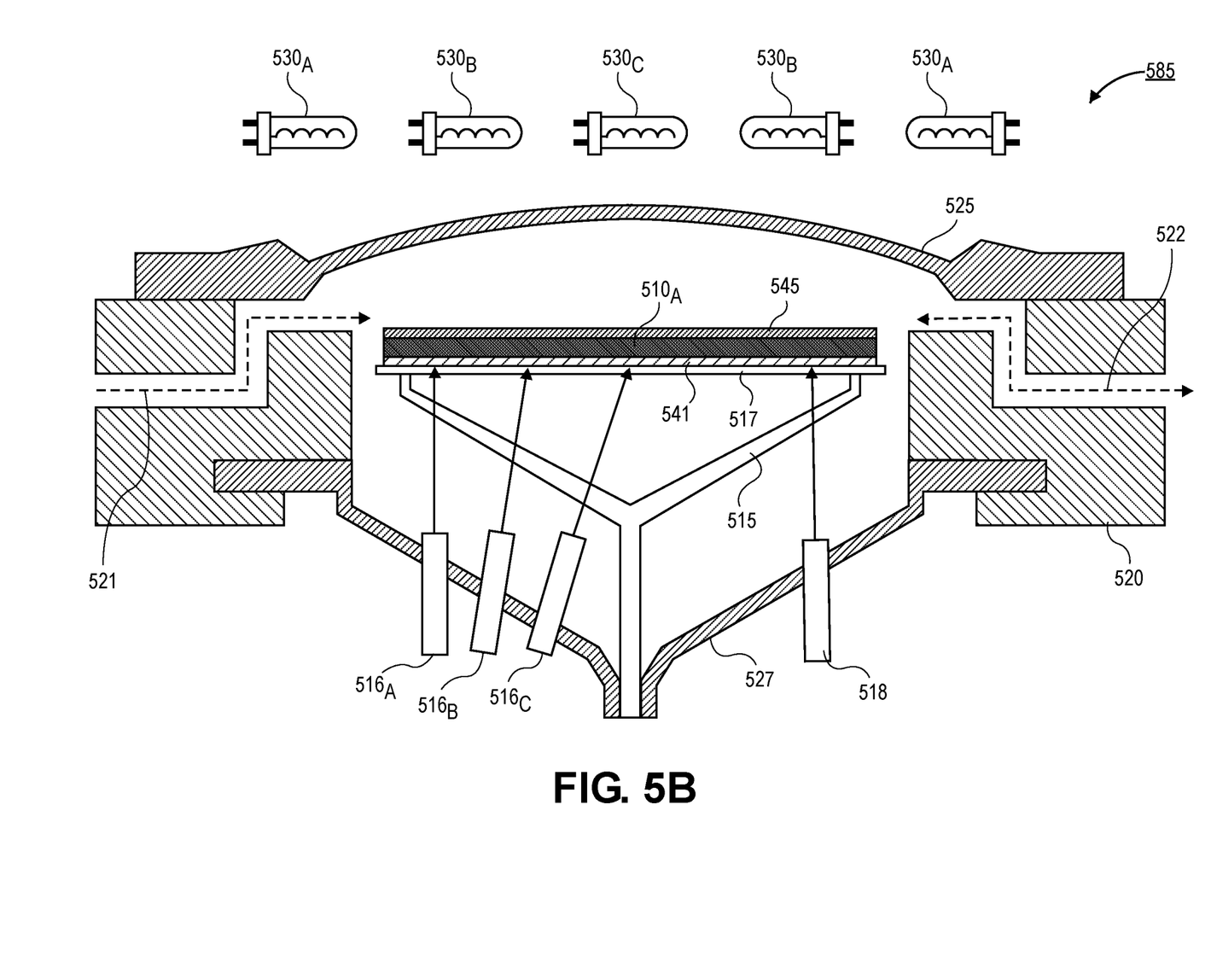
FIG. 5B is a cross-sectional illustration of a thermal oxidation tool with a substrate that has an oxide film formed over a top surface of the substrate, in accordance with an embodiment.

Referring now to FIG. 5B, a cross-sectional illustration of a chamber 585 for executing the process recipe is shown, in accordance with an embodiment. In an embodiment, the chamber 585 may comprise a chamber body 520. The chamber body 520 may include any suitable material, such as stainless steel, or the like. In an embodiment, a coating (not shown) may be provided over an interior surface of the chamber body 520. In an embodiment, gas 521 may enter the chamber 585 through a first portion of the chamber body 520, and gas 522 may exit the tool through a second portion of the chamber body 520.

In an embodiment, a substrate support 515 and a susceptor 517 are provided in the chamber. The substrate support 515 and the susceptor 517 are configured to hold and/or secure a substrate 510. For example, a first substrate $510_A$ is shown in the chamber 585. In an embodiment, the substrate support 515 and the susceptor 517 may be configured to rotate. The rotation allows for improved temperature uniformity across the substrate 510. In an embodiment, the susceptor 517 and the substrate support 515 may comprise a quartz material or another material that is at least substantially transparent to infrared radiation. As such, a temperature of the backside surface of the substrate 510 can be obtained by pyrometers 515.

In an embodiment, the chamber 585 may include a lid 525. The lid 525 may sometimes be referred to as a chamber dome. The lid 525 may be formed from a material that is at least substantially transparent to infrared radiation. For example, the lid 525 may comprise quartz or the like. In an embodiment, the chamber 585 may also include a bottom lid 527. The bottom lid 527 may cover a bottom surface of the chamber 585. The bottom lid 527 may comprise a material that is at least substantially transparent to infrared radiation. As such, pyrometers 516 on the bottom side of the chamber 585 can be used to measure a temperature of a bottom surface of the substrate $510_A$.

In an embodiment, a plurality of lamps 530 may be provided outside the internal volume of the chamber 585. In the illustrated embodiment, three sets of lamps $530_A$-$530_C$ are provided over a top surface of the lid 525. Each of the lamps $530_A$-$530_C$ represent different lamp regions. The lamps $530_A$-$530_C$ may be focused on the different zones by a reflector (not shown) that is provided around the lamps 530. While one or two lamps 530 are shown for each zone, it is to be appreciated that any number of lamps may be used to heat each zone of the substrate $510_A$. In the illustrated embodiment, three front-side lamp zones are shown. However, it is to be appreciated that more than three lamp zones may be included in other embodiments. For example, the reflector structure may include four or more zones in order to provide even more enhanced control of the temperature across the surface of the substrate $510_A$.

In an embodiment, the plurality of pyrometers $516_A$-$516_C$ may be provided through the bottom lid 527. The pyrometers 516 may be focused onto the backside surface of the substrate $510_A$. In an embodiment, the number of pyrometers 516 may be equal to the number of heating zones on the substrate $510_A$. For example, three heating zones are shown in FIG. 5B, and three pyrometers $516_A$-$516_C$ are provided.

In an embodiment, a reflectometer 518 may be situated at the same side as the pyrometers 516. The reflectometer 518 may be used to measure the emissivity of the substrate and provide that information to the algorithm.

In an embodiment, the recipe may be a thermal oxidation recipe. That is, an oxygen source may be flown into the chamber 585 as the gas 521, and the lamps 530 may be used to rapidly heat the surface of the substrate $510_A$. In an embodiment, the thermal oxidation process may result in the growth of an oxide film 545 over the top surface of the substrate $510_A$. The recipe may then be repeated for the remaining substrates $510_B$ and $510_C$.

Figure 5C:
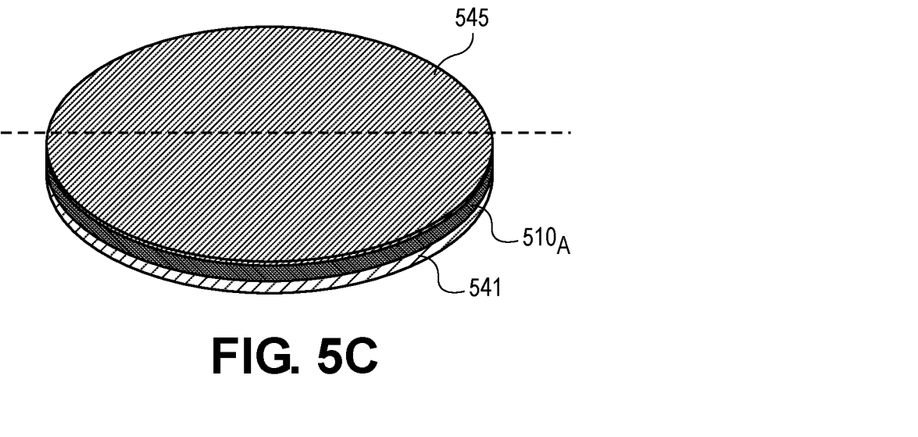
FIG. 5C is a perspective view illustration of a first substrate with an oxide film grown over a top surface of the first substrate, in accordance with an embodiment.
Figure 5D:
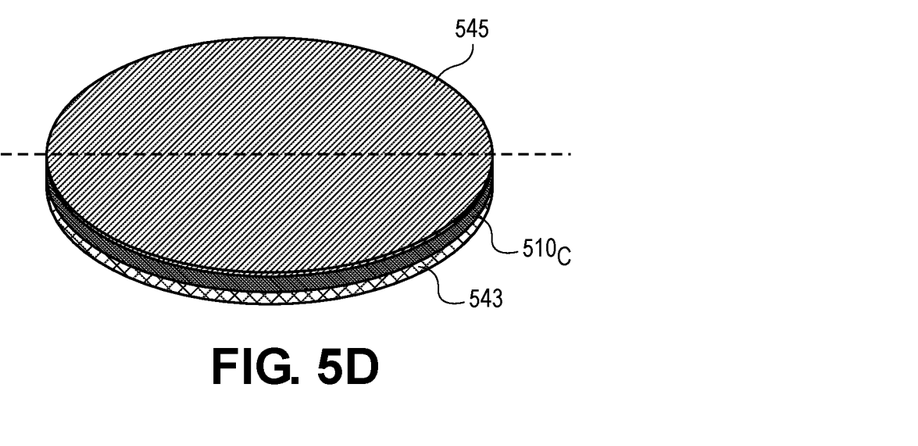
FIG. 5D is a perspective view illustration of a third substrate with an oxide film grown over a top surface of the third substrate, in accordance with an embodiment.
Figure 5E:
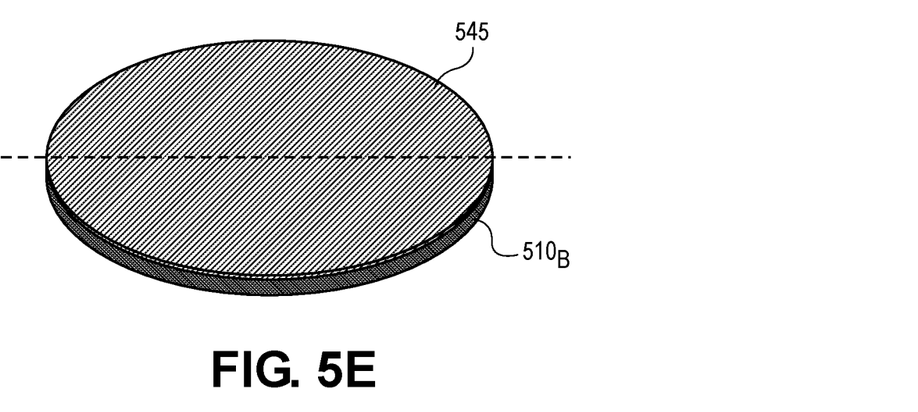
FIG. 5E is a perspective view illustration of a second substrate with an oxide film grown over a top surface of the second substrate, in accordance with an embodiment.

Referring back to process 490, the process may continue with operation 493, which comprises checking a thickness uniformity between the three substrates. In an embodiment, the thickness uniformity may be measured with a line scan tool in order to determine a thickness of the oxide film 545 across a diameter of the substrates $510_A$-$510_C$. For example, in FIGS. 5C-5E, line scans (indicated by the dashed lines) are performed across the first substrate $510_A$ (FIG. 5C), the third substrate $510_C$ (FIG. 5D), and the second substrate $510_B$ (FIG. 5E). The line scan may be done in a metrology chamber 186 that is coupled to the chamber 585 through a central chamber 183. In other embodiments, the metrology chamber may be a separate tool from the chamber 585.

Referring back to process 490, the process continues with decision block 494 which determines if the thicknesses of the oxide layers on the three substrates are uniform. If the thicknesses are uniform, it is determined that the process is emissivity independent, and the process continues to an end block 496. In such an embodiment, the calibration attributes are correct, and the tool is considered to be properly calibrated.

However, if the thicknesses are not uniform, the no path is taken and operation 495 is implemented. Operation 495 may include updating the set of calibration attributes. In an embodiment, the calibration attributes may be updated through the use of a uniformity algorithm. The uniformity algorithm may include a physics based model for the thermal heat sources and a replication of the algorithm that converts the pyrometer sensor data and reflectometer data into temperature values for the controller. The physics based model may be a thermal model of the chamber 585. That is, the heat sources, and the different components of the chamber 585 are modeled using physics based equations (e.g., heat transfer equations) in order to provide an accurate thermal model of the chamber 585. The thermal model can then be used in order to calculate the backside temperatures of the substrate at different times during the recipe. The calculated temperatures can then be compared to the pyrometer readings in order to determine an offset that is used for the updated calibration attributes. In an embodiment, the process 490 may then continue back to the beginning of the process 490 and operations 491-495 can be repeated until the thicknesses of the different substrates are uniform.

In an embodiment, the processing operations 491-494 may be implemented at the direction of the host computer 105, and the updating of the calibration attributes can be implemented by the software 101 of the tool 100. In other embodiments, the entire process 490 may be implemented by the host computer 105, or the entire process 490 may be implemented by the tool 100.

Figure 6:
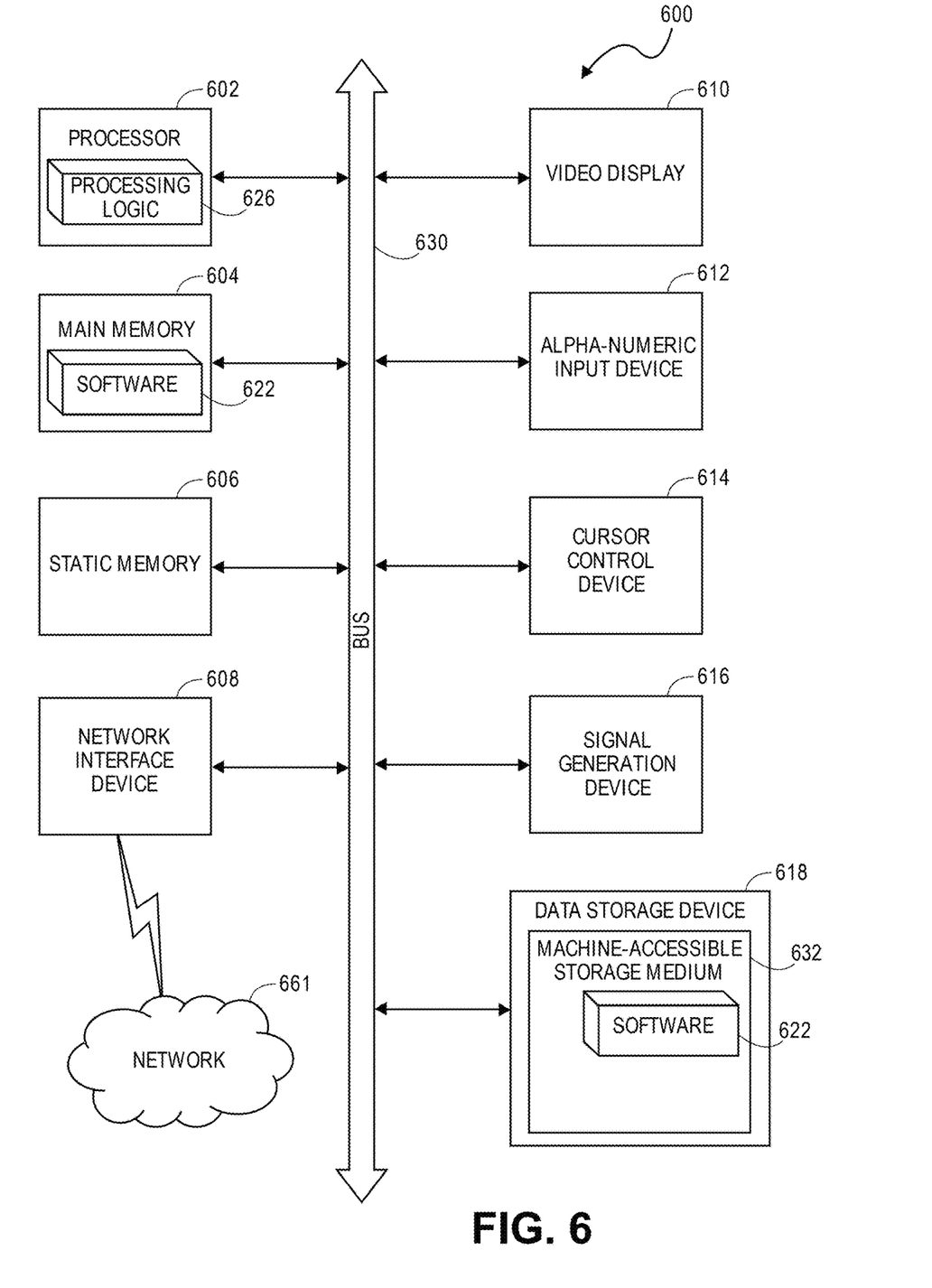
FIG. 6 illustrates a block diagram of an exemplary computer system that may be used in conjunction with a processing tool, in accordance with an embodiment.

Referring now to FIG. 6, a block diagram of an exemplary computer system 600 of a processing tool is illustrated in accordance with an embodiment. In an embodiment, computer system 600 is coupled to and controls processing in the processing tool. Computer system 600 may be connected (e.g., networked) to other machines in a Local Area Network (LAN), an intranet, an extranet, or the Internet. Computer system 600 may operate in the capacity of a server or a client machine in a client-server network environment, or as a peer machine in a peer-to-peer (or distributed) network environment. Computer system 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 600, the term "machine" shall also be taken to include any collection of machines (e.g., computers) that individually or jointly execute a set (or multiple sets) of instructions to perform any one or more of the methodologies described herein.

Computer system 600 may include a computer program product, or software 622, having a non-transitory machine-readable medium having stored thereon instructions, which may be used to program computer system 600 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 600 includes a system processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

System processor 602 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 602 may also be one or more special-purpose processing devices such as an application specific integrated circuit (ASIC), a field programmable gate array (FPGA), a digital signal system processor (DSP), network system processor, or the like. System processor 602 is configured to execute the processing logic 626 for performing the operations described herein.

The computer system 600 may further include a system network interface device 608 for communicating with other devices or machines. The computer system 600 may also include a video display unit 610 (e.g., a liquid crystal display (LCD), a light emitting diode display (LED), or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-accessible storage medium 632 (or more specifically a computer-readable storage medium) on which is stored one or more sets of instructions (e.g., software 622) embodying any one or more of the methodologies or functions described herein. The software 622 may also reside, completely or at least partially, within the main memory 604 and/or within the system processor 602 during execution thereof by the computer system 600, the main memory 604 and the system processor 602 also constituting machine-readable storage media. The software 622 may further be transmitted or received over a network 620 via the system network interface device 608. In an embodiment, the network interface device 608 may operate using RF coupling, optical coupling, acoustic coupling, or inductive coupling.

While the machine-accessible storage medium 632 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. A method of calibrating a processing tool, comprising:
   providing a first substrate with a first emissivity, a second substrate with a second emissivity, and a third substrate with a third emissivity;
   running a recipe on each of the first substrate, the second substrate, and the third substrate, wherein the recipe includes a set of calibration attributes;
   measuring a layer thickness on each of the first substrate, the second substrate, and the third substrate; and
   determining if the layer thicknesses are uniform.

2. The method of claim 1, further comprising:
   adjusting the set of calibration attributes when the layer thicknesses are non-uniform.

3. The method of claim 2, wherein the set of calibration attributes are adjusted using a uniformity algorithm.

4. The method of claim 3, wherein the uniformity algorithm comprises:
   a physics based model for thermal heat sources and a replication of algorithms that convert pyrometer sensor data into temperature data that is used to provide feedback control of the recipe.

5. The method of claim 1, wherein the calibration attributes are used to modify a signal detected by a pyrometer and sent to a controller of the processing tool.

6. The method of claim 1, wherein the first emissivity is higher than the second emissivity, and wherein the second emissivity is higher than the third emissivity.

7. The method of claim 6, wherein the first substrate comprises a film comprising nitrogen, wherein the second substrate comprises bare silicon, and wherein the third substrate comprises a film comprising oxygen.

8. The method of claim 6, wherein the first emissivity and the third emissivity are provided by films that are on surfaces of the substrates opposite from lamps used in the recipe.

9. The method of claim 8, wherein pyrometers detect signals from the films of the first substrate and the third substrate, and wherein pyrometers detect signals from the bare silicon of the second substrate.

10. The method of claim 1, wherein the recipe is a thermal oxidation recipe.

11. The method of claim 10, wherein the recipe comprises:
    controlling a plurality of lamp zones over the substrates.

12. The method of claim 1, wherein measuring the layer thicknesses is done with line scans.

13. A processing environment, comprising:
    a host computer; and
    a processing tool communicatively coupled to the host computer, wherein the host computer interfaces with software stored in a memory of the processing tool, wherein the software comprises a uniformity algorithm for setting offsets between signals measured by a pyrometer that is used by a controller as feedback to control a recipe.

14. The processing environment of claim 13, wherein the uniformity algorithm comprises:
    a physics based model for thermal heat sources and a replication of algorithms that convert pyrometer sensor data into temperature data that is used to provide the feedback control of the recipe.

15. The processing environment of claim 13, wherein the host computer includes instructions stored in a memory to process three substrates with different emissivities and compare film thicknesses formed on the three substrates.

16. The processing environment of claim 15, wherein the three substrates comprise a first substrate with a first emissivity, a second substrate with a second emissivity, and a third substrate with a third emissivity, wherein the first emissivity is higher than the second emissivity, and the second emissivity is higher than the third emissivity.

17. The processing environment of claim 13, wherein the processing tool comprises a load port, a central chamber, a processing chamber, and a metrology chamber.

18. A method for calibrating a processing tool to be emissivity independent, comprising:
    providing a first substrate with a first emissivity film, a second substrate with a bare silicon surface, and a third substrate with a second emissivity film;
    processing the first substrate, the second substrate, and the third substrate in the processing tool with a recipe to form an oxide film on the first substrate, the second substrate, and the third substrate, wherein the recipe includes calibration attributes to modify signals from a pyrometer that are sent to a controller as feedback information;
    measuring the oxide film on each of the first substrate, the second substrate, and the third substrate; and
    modifying the calibration attributes when the oxide films are non-uniform.

19. The method of claim 18, wherein the first emissivity film comprises nitrogen, and wherein the second emissivity film comprises oxygen.

20. The method of claim 18, wherein the calibration attributes are modified by a uniformity algorithm that comprises a physics based model for thermal heat sources and a replication of algorithms that convert pyrometer sensor data into temperature data that is used to provide the feedback information.

* * * * *